United States Patent [19]

Harigae et al.

[11] Patent Number: 5,153,599
[45] Date of Patent: Oct. 6, 1992

[54] CLOCK TEST APPARATUS FOR ELECTRONIC DEVICE

[75] Inventors: Masatoshi Harigae; Masaru Oka, both of Yokohama, Japan

[73] Assignee: Kabushiki Kaisha Toshiba, Kawasaki, Japan

[21] Appl. No.: 712,411

[22] Filed: Jun. 10, 1991

[30] Foreign Application Priority Data

Jun. 11, 1990 [JP] Japan .................. 2-152401

[51] Int. Cl.$^5$ ............. H04B 7/185; H04B 17/00; G01R 23/02; G01R 23/00
[52] U.S. Cl. ................ 342/352; 324/78 R; 331/44; 455/226.1
[58] Field of Search ........... 342/352, 357, 358, 165, 342/173, 174; 368/202; 331/44, 172; 375/111; 455/226, 255, 316; 324/78 R, 78 D, 79 R

[56] References Cited

U.S. PATENT DOCUMENTS

| 4,150,432 | 4/1979 | Sorden | 324/78 D |
| 4,345,206 | 8/1982 | Skalka | 324/79 R |
| 4,843,328 | 6/1989 | Greenhall | 324/78 D |

OTHER PUBLICATIONS

Shields, "Review of the Specification and Measurement of Short Term Stability" Microwave Jnl, Jun. 1969 pp. 49-55.
Characteristics of Frequency Stability, IEEE IM-20, No. 2, May 1971, pp. 105-120, James A. Barnes, et al.

Primary Examiner—Gregory C. Issing
Attorney, Agent, or Firm—Oblon, Spivak, McClelland, Maier & Neustadt

[57] ABSTRACT

A clock test apparatus connected to a GPS receiver mounted in a moving body has a frequency counter which counts clocks output from a clock generator incorporated in the GPS receiver for a predetermined period of time. In this manner, a clock frequency is detected and supplied to a clock error identification section. The clock error identification section calculates a short-term stability from the clock frequency, and further calculates a clock error on the basis of the short-term stability. The clock error data is supplied to a dynamics simulator. The dynamics simulator simulates circuit dynamics of the GPS receiver, and models error in the velocity of the moving body relative to a satellite, which results from the clock error, on the basis of the clock error data, thereby analyzing the performance of the GPS receiver.

5 Claims, 6 Drawing Sheets

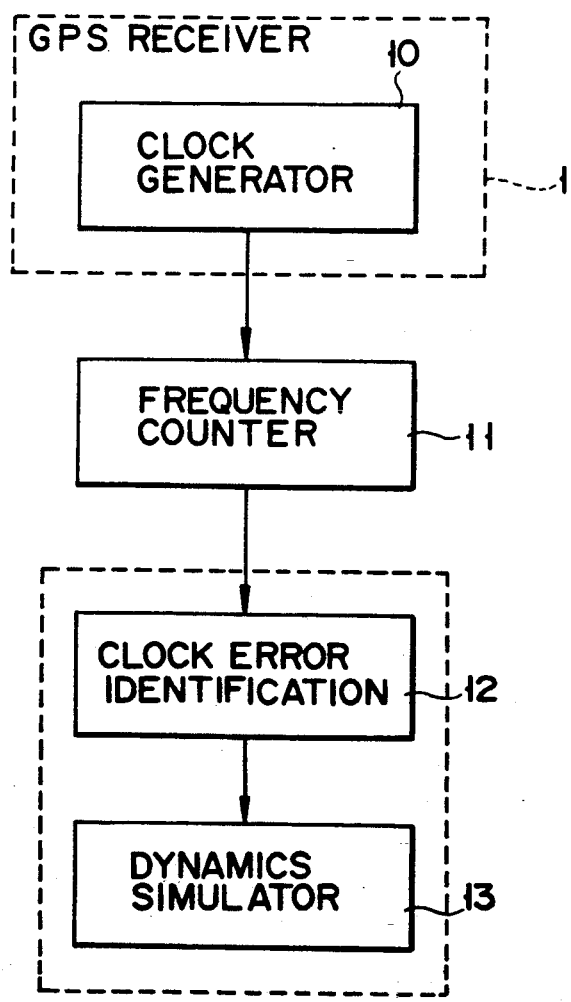
F I G. 1

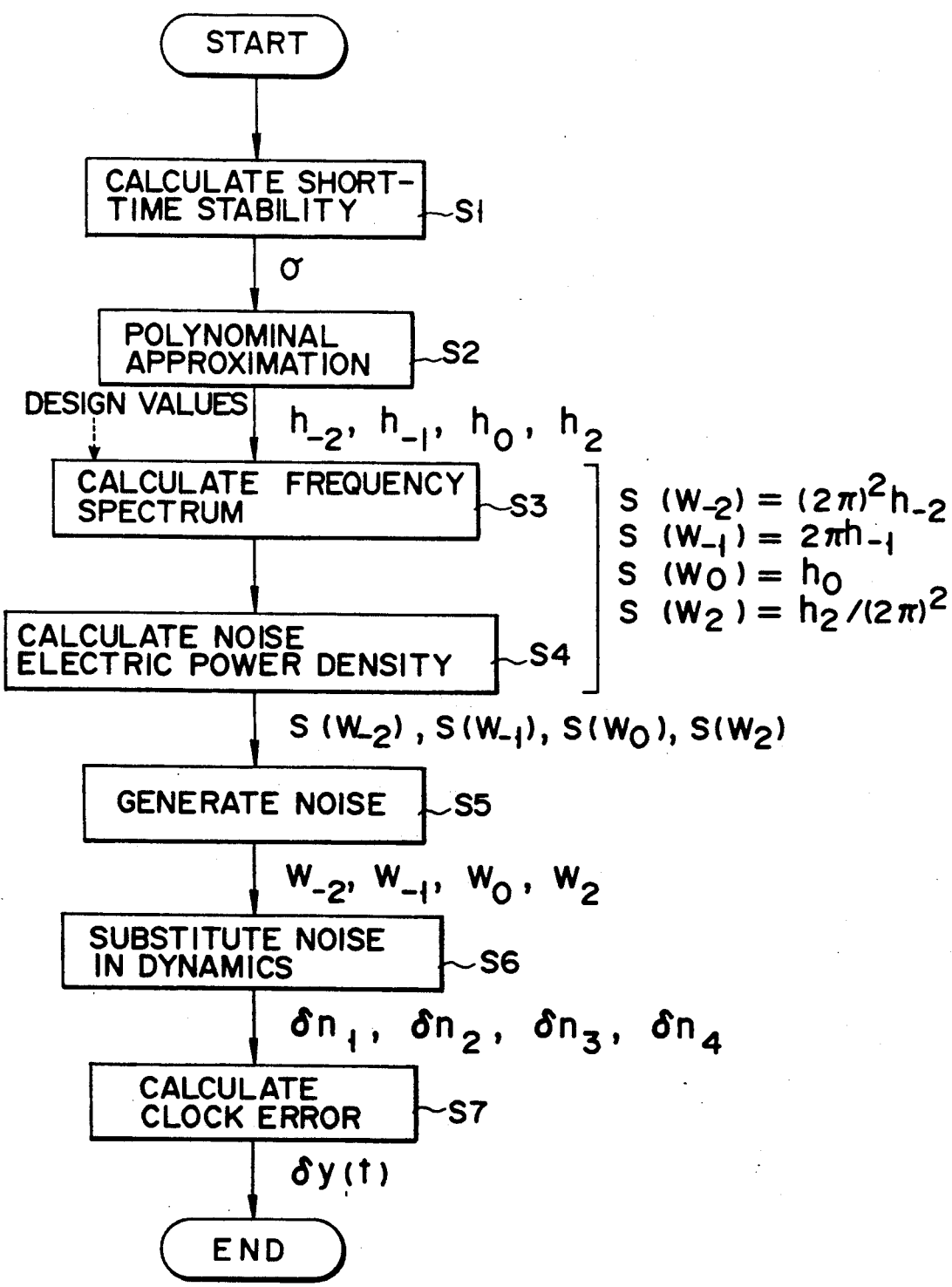
F I G. 2

CLOCK TEST APPARATUS FOR ELECTRONIC DEVICE

BACKGROUND OF THE INVENTION

1. Field of the Invention

This invention relates to a clock test apparatus for an electronic device such as a receiver, for modeling clock error in a clock generator for use in the receiver, and analyzing and checking the performance of the receiver by simulating the clock error.

2. Description of the Related Art

As is well known, a GPS (Global Positioning System) receiver is mounted in a moving body such as an aircraft or a ship, receives radio waves from GPS satellites, and outputs positional data. The GPS receiver also detects the Doppler frequency of the radio waves by means of a clock, and calculates the velocity of the moving body relative to the satellite from the detection result. A navigation calculation is performed on the basis of the positional data and the relative velocity. Hence, the performance of a GPS receiver greatly depends on the clock characteristic for detecting the Doppler frequency. Accordingly, to analyze or check the performance of a GPS receiver, it is necessary to model and simulate a clock error in the clock generator, thereby obtaining design data.

Further, a Kalman filter is used to perform the navigation calculation on the basis of the relative velocity, thereby increasing the accuracy of the calculation. The Kalman filter has a clock error dynamics model of the GPS receiver. In a GPS receiver, since the clock error dynamics model is an essential feature, the property of the model influences navigational accuracy.

In the conventional art, short-term stability, which is statistically obtained from the average value of clock frequencies, is used as an index of the characteristic of a clock, and the performance of a GPS receiver is analyzed and checked on the basis of the short-term stability. However, since the short-term stability is a statistical index, how the clock fluctuates in practice as time passes and the status of the clock error dynamics (a differential equation representing a clock error dynamics) are not taken into account. Hence, the performance of a GPS receiver cannot be analyzed and checked reliably on the basis of short-term stability.

Although the above description relates to a GPS receiver, the same problems arise in other electronic apparatuses incorporating clock generators.

SUMMARY OF THE INVENTION

The object of the invention is to provide a simple clock test apparatus, wherein clock error in a clock generator for use in an electronic device can be modeled and simulated with high accuracy, thereby increasing the reliability of the test result and the dynamics model of clock error in a data processing filter.

According to an aspect of the present invention, there is provided a clock test apparatus for modeling clock error in an electronic apparatus including a clock generator, comprising:

a frequency detecting section for detecting the frequency of a clock output from the clock generator; and a clock error identification section for statistically calculating short-term stability from an average value of the clock frequency detected by the frequency detecting section, and calculating clock error on the basis of the short-term stability.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a diagram showing an embodiment in which a clock test apparatus of the present invention is applied to a GPS receiver;

FIG. 2 is a flowchart showing an operation of the clock error identification section shown in FIG. 1 and error simulation;

DETAILED DESCRIPTION OF THE PREFERRED EMBODIMENTS

Figure 3:
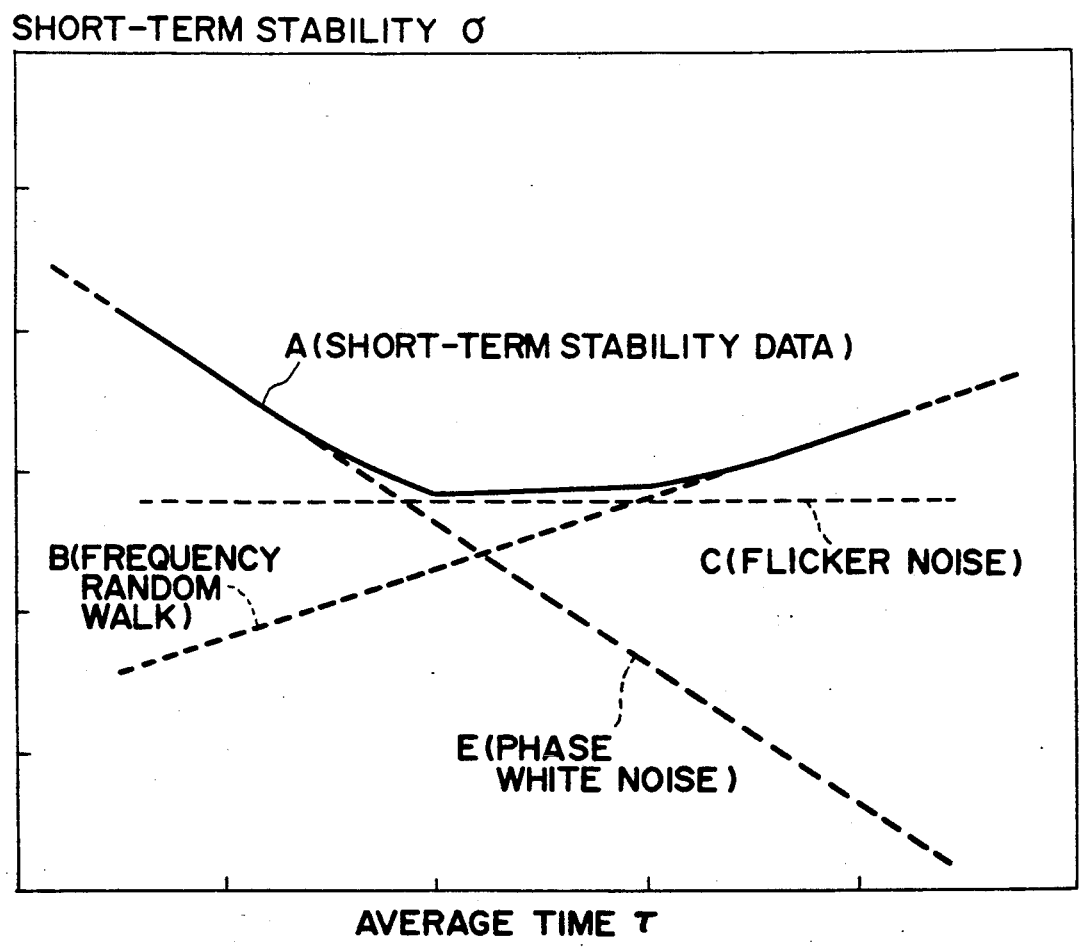
FIG. 3 is a characteristic diagram showing an example of the short-term stability of error sources of clock errors and the causes of the errors.

An embodiment of the present invention will now be described with reference to the accompanying drawings.

FIG. 1 shows an arrangement in which a GPS receiver 1 is connected to a clock test apparatus of the invention including a frequency counter 11, a clock error identification section 12, and a dynamics simulator 13. The frequency counter 11 receives a clock output from a clock generator 10 incorporated in the GPS receiver 1, and detects the frequency of the clock. The clock frequency data is supplied from the frequency counter 11 to the clock error identification section 12.

The clock error identification section 12 receives the clock frequency data from the frequency counter 11, obtains short-term stability from the data, and calculates a clock error on the basis of the short-term stability. Clock error data obtained by the clock error identification section 12 is supplied to the dynamics simulator 13, which simulates circuit dynamics of the GPS receiver. More specifically, the dynamics simulator receives the clock error simulation data, and calculates a relative velocity error due to the influence of the clock error, thereby analyzing the performance of the receiver. The clock error identification section 12 and the dynamics simulator 13 are each constituted by a computer.

An operation of the clock error identification section 12 will be described below with reference to the flowchart shown in FIG. 2.

In step S1, short-term stability $\sigma$, which represents a clock characteristic, is obtained on the basis of the clock frequency data supplied from the frequency counter 11. The short-term stability $\sigma$ is obtained in a statistical fashion from the average value of clock frequencies. More specifically, assuming that an average value of clock frequencies y during a time period from $t_{k}-\tau$ to $t_k$ is $Y_k$, and an average value thereof during a time period from $t_{k+1}-\tau$ to $t_{k+1}$ is $\overline{Y}_{k+1}$, the short-term stability $\sigma$ is determined by the following formula:

$$\sigma^2 = (\tfrac{1}{2})<(\overline{Y}_{k+1}-\overline{Y}_k)2> \tag{1}$$

where $\tau$ represents an average time, $t_k$ is equal to $t_{k+1}-\tau$, and a symbol $<>$ represents an ensemble means. A short-term stability $\sigma$ and an average time $\tau$ have a relationship, for example, as is indicated by the solid line A in FIG. 3.

In general, clock error sources $\delta n_i$ include the following: a frequency random walk error source $\delta n_1$, a frequency flicker noise error source $\delta n_2$, a frequency white noise error source $\delta n_3$, and a phase white noise error source $\delta n_4$. Short-term stabilities $\sigma(\delta n_1)$, $\sigma(\delta n_2)$, $\sigma(\delta n_3)$, and $\sigma(\delta n_4)$ of the error sources are represented by the following formulas:

$$\sigma(\delta n_1) = 4\pi^2 h_{-2} \cdot \tau/6 \tag{2}$$

$$\sigma(\delta n_2) = 2h_{-1} \cdot ln(2) \tag{3}$$

$$\sigma(\delta n_3) = h_0/(2\tau) \tag{4}$$

$$\sigma(\delta n_4) = 3f_h h_2/\{(2\pi)^2\tau^2\} \tag{5}$$

where $f_h$ represents the cut-off frequency of white noise, and ln represents a natural logarithm.

In view of these formulas (2) to (5), the short-term stability $\sigma(\delta n_1)$ of the frequency random walk is proportional to the average time $\tau$ (the formula (2)), the stability $\sigma(\delta n_2)$ of the frequency flicker noise is a constant (the formula (3)), the stability $\sigma(\delta n_3)$ of the frequency white noise is proportional to $1/\tau$ (the formula (4)) and the stability $\sigma(\delta n_4)$ of the phase white noise is proportional to $1/\tau^2$ (the formula (5)). Hence, using the formulas (2) to (5), short-term stability $\sigma$ of the receiver clock can be polynomial-approximated from the clock error sources $\delta n_i$.

In step S2, the coefficients $h_{-2}$, $h_{-1}$, $h_0$, and $h_2$ are substituted in the above equations (2) to (5), and the short-time stability $\sigma$ obtained in step S1 is polynomial-approximated by adding together the equations (2) to (5) for calculating the error sources $\delta n_1$, $\delta n_2$, $\delta n_3$, and $\delta n_4$.

As is shown in FIG. 3, the short-time stability characteristic of the clock error indicated by the solid line A can be polynomial-approximated by adding together the short-term stability characteristics of the three error sources $\sigma(\delta n_1)$, $\sigma(\delta n_2)$, and $\sigma(\delta n_4)$ indicated by the dot lines B, C, and D. Hence, the short-term stability $\sigma$ of the clock error can be approximated by substituting the values of the coefficients $h_{-2}$, $h_{-1}$, $h_0$, and $h_2$ in the formulas (2) to (5), and adding the formulas (2), (3), and (5) relating to the short-time stability of the error sources $\sigma(\delta n_1)$, $\sigma(\delta n_2)$, and $\sigma(\delta n_4)$.

Power spectrum densities $S(\delta n_1)$, $S(\delta n_2)$, $S(\delta n_3)$ and $S(\delta n_4)$ are related to a Fourier frequency f as follows:

$$S(\delta n_1) = h_{-2}/f^2 \tag{6}$$

$$S(\delta n_2) = h_{-1}/f \tag{7}$$

$$S(\delta n_3) = h_0 \tag{8}$$

$$S(\delta n_4) = h_2 f^2 \tag{9}$$

Thus, $S(\delta n_1)$ and $S(\delta n_2)$ are proportional to $1/f^2$ and $1/f$, respectively, $S(\delta n_3)$ represents a constant value, and $S(\delta n_4)$ is proportional to $f^2$.

In a step S3, the coefficients $h_{-2}$, $h_{-1}$, $h_0$, and $h_2$ given in the step S2 are substituted in the formulas (6) to (9), thereby calculating frequency spectrum densities of the error sources $\delta n_1$, $\delta n_2$, $\delta n_3$, and $\delta n_4$.

Dynamics (transfer functions) $D(\iota n_1)$, $D(\delta n_2)$, $D(\delta n_3)$, and $D(\delta n_4)$ are obtained from the power spectrum density functions as follows:

$$D(\delta n_1) = 1/s \tag{10}$$

$$D(\delta n_2) = (Ts+1)/(10Ts+1) \tag{11}$$

$$D(\delta n_3) = 1 \tag{12}$$

$$D(\delta n_4) = s \tag{13}$$

where T represents a constant corresponding to $\tau$ in which flicker noise $\delta n_2$ is prominent. Thus, the error sources $W_{-2}$, $W_{-1}$, $W_0$, and $W_2$ of $\delta n_1$, $\delta n_2$, $\delta n_3$, and $\delta n_4$ generate different errors in accordance with their power densities.

In step S4, electric power densities of white noise are calculated by the following formulas, such that when white noise is input, the outputs of the dynamics $D(\delta n_1)$, $D(\delta n_2)$, $D(\delta n_3)$, and $D(\delta n_4)$ coincide with the frequency spectrum densities obtained in step S3:

$$S(W_{-2}) = (2\pi)^2 h_{-2} \tag{14}$$

$$S(W_{-1}) = 2\pi h_{-1} \tag{15}$$

$$S(W_0) = h_0 \tag{16}$$

$$S(W_2) = h_2/(2\pi)^2 \tag{17}$$

where $W_{-2}$, $W_{-1}$, $W_0$, and $W_2$ represent white noise, and $S( )$ represents the power spectrum density of the corresponding noise.

In step S5, noise $W_{-2}$, $W_{-1}$, $W_0$, and $W_2$ are generated in accordance with the power spectrum densities $S(W_{-2})$, $S(W_{-1})$, $S(W_0)$, and $S(W_2)$, respectively. In step S6, the noises $W_{-2}$, $W_{-1}$, $W_0$, and $W_2$ are input in the dynamics represented by the above-mentioned formulas (10) to (13), thereby obtaining values of error sources $\delta n_1(t)$, $\delta n_2(t)$, $\delta n_3(t)$, and $\delta n_4(t)$ at time t. In step S7, a clock error $\delta y(t)$ is obtained by the following formula:

$$\delta y(t) = \Sigma \delta n_i(t) \tag{18}$$

Figure 4:
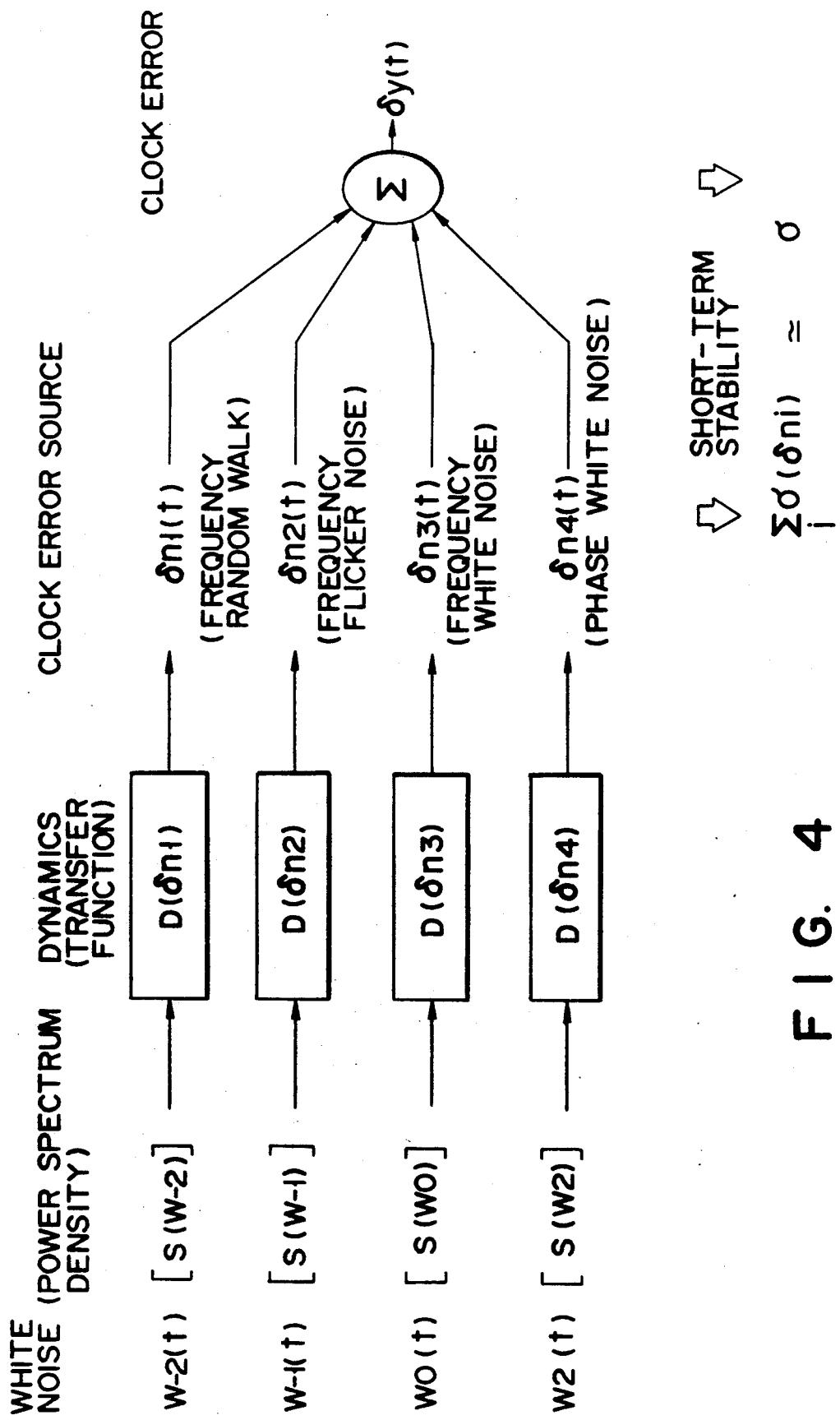
FIG. 4 is a system diagram showing a method of simulating a clock error in the clock error identification section.

FIG. 4 shows a processing system utilizing the above steps S5 to S7.

Figure 5:
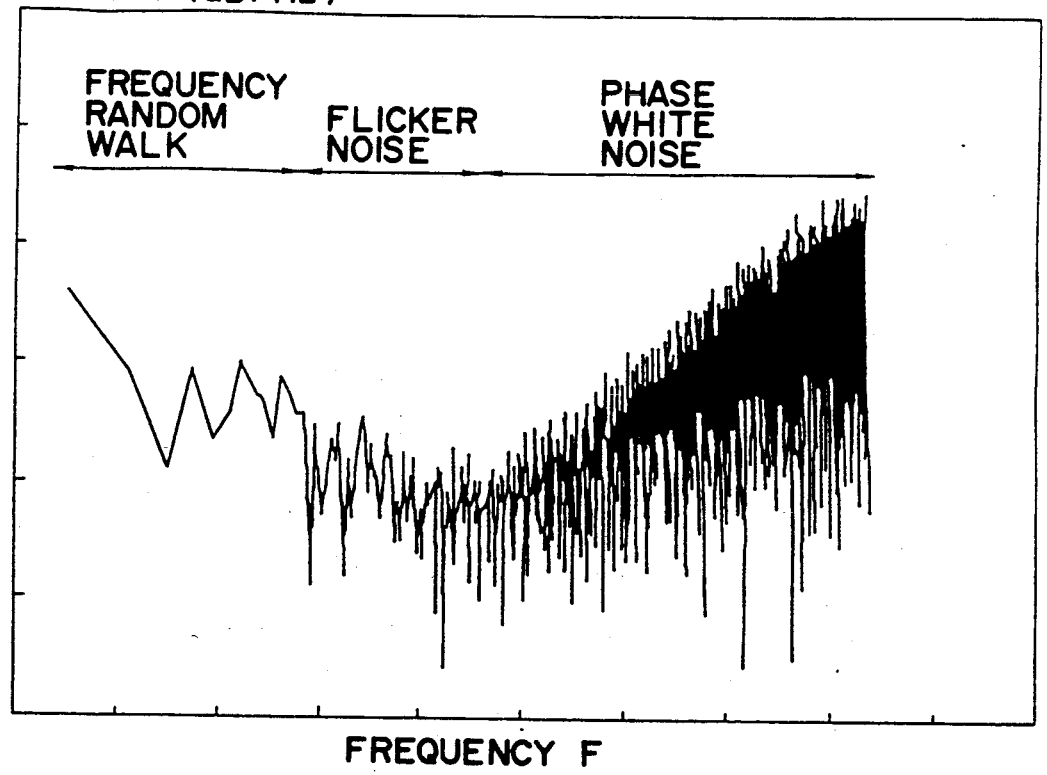
FIG. 5 is a waveform diagram showing a relationship between frequency error and power spectrum density of the clock error having short-time stability shown in FIG. 3.

As is described above with reference to FIG. 3, the short-time stability characteristic A of a clock error can be determined by the short-term stability characteristics B, C, and D of the three error sources $\delta n_1$, $\delta n_2$, and $\delta n_4$ of frequency random walk, frequency flicker noise, and phase white noise. FIG. 5 shows a relationship between a Fourier frequency and a power spectrum density regarding a clock error $\delta y(t)$ obtained in the step S7. As is obvious from FIG. 5, the clock error δy(t) is obtained by adding the error sources δn₁, δn₂, and δn₄.

Figure 6:
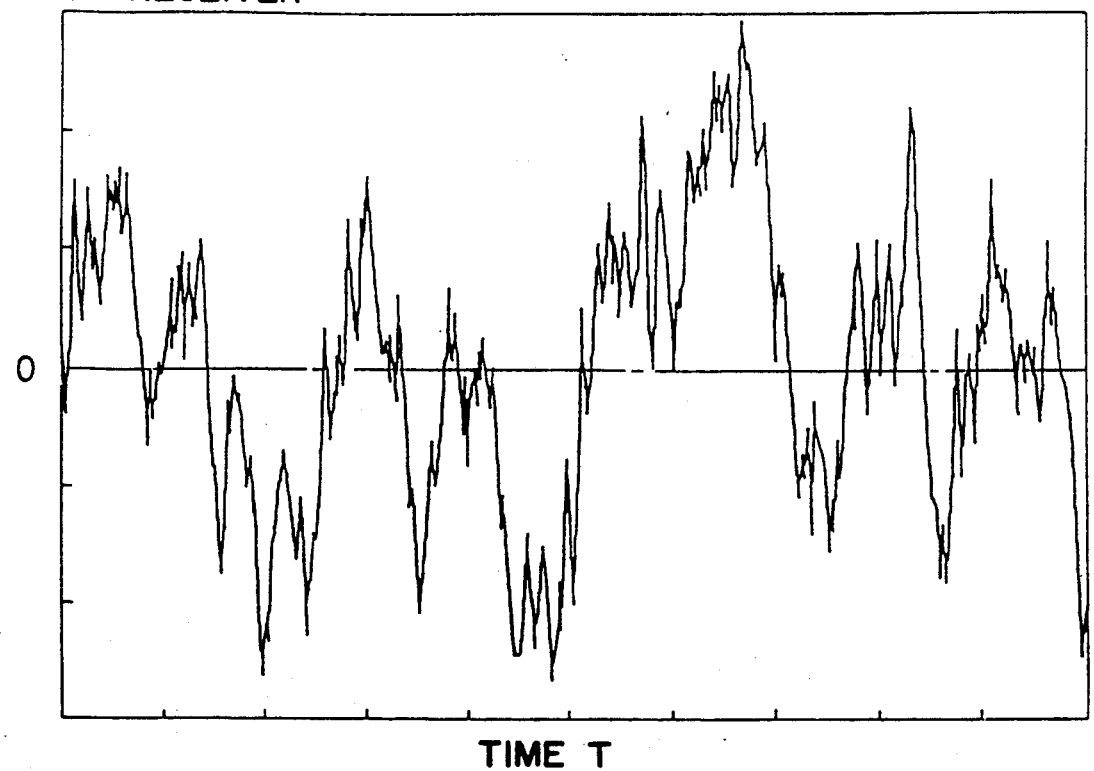
FIG. 6 is a waveform diagram showing an example of the results of the analysis by the dynamics simulator shown in FIG. 1.

An operation of the dynamics simulator 13 will now be described with reference to FIG. 6.

The dynamics simulator 13 receives clock error δy(t) obtained by the clock error identification section 12, and calculates an error of the relative velocity of a receiver caused by the clock error δy(t), thereby analyzing the performance of the receiver. FIG. 6 shows an example of the analysis result. The relative velocity error data can be used in, for example, designing a GPS receiver circuit and selecting a clock generator for use in a GPS receiver.

As described above, the clock test apparatus calculates short-term stability from the output frequency of the clock generator 10, and obtains an error of the clock generator 10 as error dynamics. In addition, an error of the clock generator 10 is simulated on the basis of the error dynamics, thereby analyzing the performance of the GPS receiver connected to the clock test apparatus. By virtue of these features, error can be accurately simulated in accordance with an actual fluctuation of the clock generator 10, and performance analyses and tests can be performed with high accuracy.

In the above-described embodiment, the performance of a GPS receiver is analyzed and checked on the basis of a clock error δy(t) calculated by the clock error identification section 12. However, this invention is not limited to this embodiment. For example, the clock error dynamics calculated by the clock error identification section 12 can be used as a system model for a Kalman filter. With this feature, since the accuracy of the clock generator 10 which determines the performance of a GPS receiver is detected precisely, a Kalman filter with high accuracy can be fabricated, with the result that accurate navigation can be easily performed.

Moreover, in the above embodiment, the clock error identification section 12 simulates an error of the clock generator 10 on the basis of coefficients $h_{-2}$, $h_{-1}$, $h_0$, and $h_2$ obtained in the step S2. However, if design values are substituted in step S3 as indicated by the dot line in FIG. 2, a permissible error in the receiver can be calculated back. As a result, a suitable clock generator can be selected easily.

Further, although short-term stability is detected by the frequency counter 11 in the above embodiment, it may be detected by other apparatuses.

Still further, although the clock check apparatus is connected to a GPS receiver in the above embodiment, the present invention can be applied to various electronic devices, for example, a receiver including a frequency detecting clock.

Thus, the present invention is not limited to the above-described embodiment, but can be variously modified without departing from the spirit and scope of the invention.

Additional advantages and modifications will readily occur to those skilled in the art. Therefore, the invention in its broader aspects is not limited to the specific details, and representative devices, shown and described herein. Accordingly, various modifications may be without departing from the spirit or scope of the general inventive concept as defined by the appended claims and their equivalents.

What is claimed is:

1. A clock test apparatus for modeling a clock error of an electronic apparatus including a clock generator, comprising:
   a frequency detecting section for detecting the frequency of a clock output from said clock generator; and
   a clock error identification section for statistically calculating a short-term stability from an average value of the clock frequency detected by said frequency detecting section, and calculating a clock error on the basis of the short-term stability;
   wherein said clock error identification section executes:
   a first step of statistically calculating a short-term stability on the basis of a time-based average of the clock frequency detected by said frequency detecting section;
   a second step of subjecting the clock error to polynomial-approximation by using formulas representing short-term stability of error sources which result in the clock error on the basis of the short-term stability obtained in the first step;
   a third step of calculating a frequency spectrum density of the error sources on the basis of the coefficients in an approximate formula obtained in the second step;
   a fourth step of calculating a power spectrum density which coincides with the frequency spectrum density obtained in the third step, when the power spectrum density is input to a predetermined dynamics representing a transfer function of the error sources;
   a fifth step of generating noise in accordance with the power spectrum density obtained in the fourth step;
   a sixth step of calculating values of the error sources by inputting the noise generated in the fourth step in the dynamics of the error sources; and
   a seventh step of calculating the clock error by adding together the values of the error sources obtained in the sixth step;
   said clock test apparatus further comprising a dynamics simulator for simulating circuit dynamics of said electronic apparatus, receiving the clock error obtained by said clock error identification section, and calculating an error in the circuit operation of said electronic apparatus resulting from said clock error.

2. A clock test apparatus according to claim 1, wherein said frequency detecting section includes a frequency counter for counting clocks output from said clock generator over a predetermined period of time.

3. A clock test apparatus according to claim 1, wherein said error sources include frequency random walk, frequency flicker noise, frequency white noise, and phase white noise.

4. A clock test apparatus according to claim 1, wherein:
   said electronic apparatus is a GPS receiver which is mounted in a moving body, and detects, by means of a clock, the Doppler frequency of a radio wave received by said GPS receiver, thereby obtaining a relative velocity of the moving body with respect to a satellite on the basis of the detected frequency;
   said clock generator generates a clock which is to be used in detecting the Doppler frequency of the received radio wave; and said dynamics simulator simulates circuit dynamics of said GPS receiver, receives a clock error obtained by said clock error identification section, and calculates an error resulting from the clock error in the circuit operation of said electronic apparatus.

5. A clock test apparatus for modeling a clock error of an electronic apparatus including a clock generator, comprising:

a first arithmetic means for receiving coefficients of formulas representing short-term stability of error sources which results in a clock error in the clock generator, and calculating frequency spectrum densities of the error sources on the basis of the coefficients;

a second arithmetic means for calculating a power spectrum density which coincides with the frequency spectrum density obtained in the first arithmetic means, when the power spectrum density is input to a predetermined dynamics representing a transfer function of the error sources;

a third arithmetic means for generating noise in accordance with the power spectrum density obtained by the second arithmetic means;

a fourth arithmetic means for calculating values of the error sources by substituting the noise generated by the third arithmetic means in the dynamics of the error sources;

a fifth arithmetic means for calculating the clock error by adding the values of the error sources obtained by the fourth arithmetic means; and a dynamics simulator for simulating circuit dynamics of said electronic apparatus, receiving the clock error obtained by said fifth arithmetic means, and calculating an error in the circuit operation of said electronic apparatus resulting from said clock error.

* * * * *